(12) United States Patent
Serada et al.

(10) Patent No.: US 8,537,704 B2
(45) Date of Patent: Sep. 17, 2013

(54) DATA PROCESSING SYSTEM, CENTRAL MANAGEMENT UNIT THEREOF, AND DATA PROCESSING METHOD

(75) Inventors: Teruharu Serada, Tokyo (JP); Shinya Arao, Tokyo (JP); Hirokazu Yamada, Tokyo (JP); Noriaki Hayase, Tokyo (JP); Takayuki Omino, Tokyo (JP); Yasuaki Tsunemi, Tokyo (JP); Kenichi Kamiya, Tokyo (JP); Michio Nishioka, Tokyo (JP)

(73) Assignee: NEC Corporation, Tokyo (JP)

(*) Notice: Subject to any disclaimer, the term of this patent is extended or adjusted under 35 U.S.C. 154(b) by 403 days.

(21) Appl. No.: 12/936,809

(22) PCT Filed: Apr. 3, 2009

(86) PCT No.: PCT/JP2009/001568
§ 371 (c)(1),
(2), (4) Date: Oct. 7, 2010

(87) PCT Pub. No.: WO2009/125564
PCT Pub. Date: Oct. 15, 2009

(65) Prior Publication Data
US 2011/0038289 A1 Feb. 17, 2011

(30) Foreign Application Priority Data
Apr. 8, 2008 (JP) .................................. 2008-100389

(51) Int. Cl.
*H04J 1/16* (2006.01)
(52) U.S. Cl.
USPC .......................................... 370/252; 370/310
(58) Field of Classification Search
USPC .................. 370/229, 230, 235, 252, 310, 352, 370/260, 261, 262, 263; 709/204, 224, 226; 379/202.01; 705/13, 14.1, 27.1, 14.53, 5, 705/3
See application file for complete search history.

(56) References Cited

U.S. PATENT DOCUMENTS

| 2004/0034723 A1* | 2/2004 | Giroti ............................. 710/8 |
| 2004/0059815 A1* | 3/2004 | Buckingham et al. ........ 709/224 |

(Continued)

FOREIGN PATENT DOCUMENTS

| JP | 6-236488 A | 8/1994 |
| JP | H06251046 A | 9/1994 |

(Continued)

OTHER PUBLICATIONS

International Search Report for PCT/JP2009/001568 mailed Apr. 28, 2009.

(Continued)

*Primary Examiner* — Abdullah Riyami (57) ABSTRACT

A plurality of data communication terminals having a data display function is individually provided in each of a plurality of locations of use where general users individually check in. A user storage unit stores the user ID data and the location ID data with respect to each general user who has checked in, and a situation storage unit stores user situation data of the general user who has checked in, together with the user ID data. A group identification unit identifies the plurality of general users who have checked in as a group, and a listing display unit causes each of the data communication terminals in the plurality of locations of use where the general users of the group have checked in, to display a listing of at least the user ID data, the location ID data, and the user situation data of another member of the group. Thus, a data processing system is provided that allows the general users of the group, who have individually checked in for the plurality of locations of use, to confirm the situation of another member at a glance.

10 Claims, 9 Drawing Sheets

(56) References Cited

U.S. PATENT DOCUMENTS

| | | | |
|---|---|---|---|
| 2005/0243809 A1* | 11/2005 | Best et al. | 370/356 |
| 2006/0023658 A1* | 2/2006 | Phillips et al. | 370/328 |
| 2006/0050686 A1* | 3/2006 | Velez-Rivera et al. | 370/352 |
| 2006/0069726 A1* | 3/2006 | McKibben et al. | 709/204 |
| 2006/0187859 A1* | 8/2006 | Shaffer et al. | 370/260 |
| 2006/0230137 A1* | 10/2006 | Gare et al. | 709/224 |
| 2007/0162569 A1* | 7/2007 | Robinson et al. | 709/219 |
| 2007/0189269 A1* | 8/2007 | Ho et al. | 370/352 |
| 2007/0217591 A1* | 9/2007 | Yasuma | 379/202.01 |
| 2008/0059254 A1* | 3/2008 | Vivadelli et al. | 705/5 |
| 2008/0205616 A1* | 8/2008 | Teng et al. | 379/202.01 |
| 2008/0208680 A1* | 8/2008 | Cho | 705/13 |
| 2008/0274796 A1* | 11/2008 | Lube | 463/25 |
| 2008/0279117 A1* | 11/2008 | Brisco et al. | 370/259 |
| 2009/0252208 A1* | 10/2009 | Frye, Jr. | 375/222 |
| 2011/0158228 A1* | 6/2011 | Dowling et al. | 370/352 |
| 2011/0256847 A1* | 10/2011 | Schindler et al. | 455/411 |
| 2012/0329475 A1* | 12/2012 | Ribaudo et al. | 455/456.1 |

FOREIGN PATENT DOCUMENTS

| | | |
|---|---|---|
| JP | S62224177 A | 10/1997 |
| JP | 2001118181 A | 4/2001 |
| JP | 2002024413 A | 1/2002 |
| JP | 2004336140 A | 11/2004 |
| JP | 2007251714 A | 9/2007 |
| JP | 2007274683 A | 10/2007 |
| JP | 2008035299 A | 2/2008 |

OTHER PUBLICATIONS

M. Oshima, "IP Denwa ga Jitsugen suru Aratana Communication", Network World; vol. 11, No. 8, IDG Japan, Inc., Aug. 1, 2006, pp. 116-120.

H. Nagai, "Com@WILL Series ni yoru Ubiquitous Service no Tenkai", OKI Technical Review, vol. 74, No. 2, Apr. 1, 2007, pp. 44-47.

Japanese Office Action for JP2008-100389 mailed on Jul. 17, 2012.

* cited by examiner

DATA PROCESSING SYSTEM, CENTRAL MANAGEMENT UNIT THEREOF, AND DATA PROCESSING METHOD

The present application is the National Phase of PCT/JP2009/001568, filed Apr. 3, 2009, which claims priority based on Japanese patent application No. 2008-100389 filed on Apr. 8, 2008.

TECHNICAL FIELD

The present invention relates to a data processing system that can be utilized in accommodation facilities where general users individually check in for a plurality of locations of use, a central management unit and a computer program for such system, and a data processing method.

BACKGROUND ART

In the currently available accommodation facilities and long-distance trains, general users individually check in for a hotel room or a reserved seat which are the location of use. There are cases, for example, where a plurality of general users who has checked in as a group separately stays in a hotel room. Such general user can make internal calls through a phone terminal provided in the hotel room, by mutually confirming the room numbers.

Various proposals have been made for improving the convenience of such accommodation facilities and general users. For example, a system has been proposed in which a management server controlled by the accommodation facilities and a guest terminal unit that can be operated by the guest are connected via the internet, so that the guest and the accommodation facilities can enjoy upgraded convenience (for example, Patent Document 1).

Also, a system has been proposed that performs unified management of entry to the hotel room and accounting of utilization charges of the facilities in the hotel by a credit cart owned by the guest (for example, Patent Document 2).
[Patent Document 1] JP Laid-Open No. 2002-024413
[Patent Document 2] JP Laid-Open No. H06-236488

DISCLOSURE OF THE INVENTION

However, although the foregoing systems can upgrade the convenience for the accommodation facilities and the individual general user, the systems are not designed for improving the convenience for the plurality of general users who checks in as a group.

Accordingly, the general users who have checked in as the group have to input the room number for making an internal call, which is not only troublesome but often provokes a wrong number call.

Besides, whether a general user who has checked in as the group is in the room or outside can only be confirmed through the internal phone or by directly visiting the room, and such confirmation is also troublesome, and uncertain.

The present invention has been accomplished in view of the foregoing situation, and provides a data processing system that allows general users of a group that has individually checked in for a plurality of locations of use to confirm a situation of another member at a glance, a central management unit and a computer program for such system, and a data processing method.

According to the present invention, there is provided a data processing system, comprising: a plurality of data communication terminals that have at least a data display function, and that are individually provided in each of a plurality of locations of use where general users individually check in; a utilization registration unit that accepts an input of user ID data and location ID data of the location of use, with respect to each general user who checks in; a user storage unit that stores the inputted user ID data and the location ID data in association with each other; a situation storage unit that stores user situation data of the general user who has checked in with respect to each location of use, together with the user ID data; a group identification unit that identifies the plurality of general users who have checked in as a group; and a listing display unit that causes each of the data communication terminals in the plurality of locations of use where the general users of the group have checked in, to display a listing of at least the user ID data, the location ID data, and the user situation data of another member of the group.

According to the present invention, there is provided a central management unit for use in the data processing system according to the present invention, comprising: a utilization registration unit that accepts an input of user ID data and location ID data of the location of use, wish respect to each general user who checks in; a user storage unit that stores the inputted user ID data and the location ID data in association with each other; a situation storage unit that stores user situation data of the general user who has checked in with respect to each location of use, together with the user ID data; a group identification unit that identifies the plurality of general users who has checked in as a group; and a listing display unit that causes each of the data communication terminals in the plurality of locations of use where the general users of the group have checked in, to display a listing of at least the user ID data, the location ID data, and the user situation data of another member of the group.

According to the present invention, there is provided a computer program for use in the central management unit according to the present invention, comprising a function of causing the central management unit to execute: a utilization registration process of accepting an input of user ID data and location ID data of the location of use, with respect to each general user who checks in; a user storage process of storing the inputted user ID data and the location ID data in association with each other; a situation storage process of storing user situation data of the general user who has checked in with respect to each location of use, together with the user ID data; a group identification process of identifying the plurality of general users who has checked in as a group; and a listing display process of causing each of the data communication terminals in the plurality of locations of use where the general users of the group have checked in, to display a listing of at least the user ID data, the location ID data, and the user situation data of another member of the group.

According to the present invention, there is provided a data processing method to be executed by the central management unit according to the present invention, comprising: registering utilization by accepting an input of user ID data and location ID data of the location of use, with respect to each general user who checks in; storing the inputted user ID data and the location ID data in association with each other; storing user situation data of the general user who has checked in with respect to each location of use, together with the user ID data; identifying the plurality of general users who has checked in as a group; and causing each of the data communication terminals in the plurality of locations of use where the general users of the group have checked in, to display a listing of at least the user ID data, the location ID data, and the user situation data of another member of the group.

It is to be noted that a form of each constituent of the present invention is not limited as long as it is capable of performing the intended function, and may be, for example, an exclusive hardware that performs a predetermined function, a data processor in which a predetermined function is incorporated as a computer program, a predetermined function realized in a data processor by a computer program, and an optional combination thereof.

Also, the constituents of the present invention do not necessarily have to be individually independent, but may be configured such that a plurality of constituents constitutes a single member, a constituent is composed of a plurality of members, a constituent is a part of another constituent, a part of a constituent and a part of another constituent overlap, and so forth.

Although a plurality of steps may be sequentially stated in the description of data processing method according to the present invention, such sequence does not necessarily limit the order in practically executing those steps, unless so expressed. Accordingly, the sequence of the plurality of steps may be modified when executing the data processing method according to the present invention, unless inconvenience is incurred.

Further, the plurality of steps of the data processing method according to the present invention does not have to be individually executed at different timings. In other words, the method may be arranged such that one of the steps is executed during the execution of another, that the execution timing of a step partially or entirely overlap that of another, and so forth.

In the data processing system according to the present invention, the plurality of data communication terminals, individually provided in each of the plurality of locations of use where general users individually check in, has at least the data display function. When the utilization registration unit accepts an input of the user ID data and the location ID data of the locations of use, with respect to each general user who checks in, the user storage unit stores the inputted user ID data and the location ID data in association with each other, and the situation storage unit stores user situation data of the general user who has checked in wish respect to each location of use, together with the user ID data. Here, the group identification unit identifies the plurality of general users who has checked in as a group, and the listing display unit causes each of the data communication terminals in the plurality of locations of use where the general users of the group have checked in, to display a listing of at least the user ID data, the location ID data, and the user situation data of another member of the group. Such structure allows the general users who have checked in as the group for the plurality of locations of use to confirm the situation of another member, at a glance.

BRIEF DESCRIPTION OF THE DRAWINGS

The above and other objects, features and advantages will become more apparent through the description of preferred embodiment given below and the following accompanying drawings.

BEST MODE FOR CARRYING OUT THE INVENTION

Figure 1:
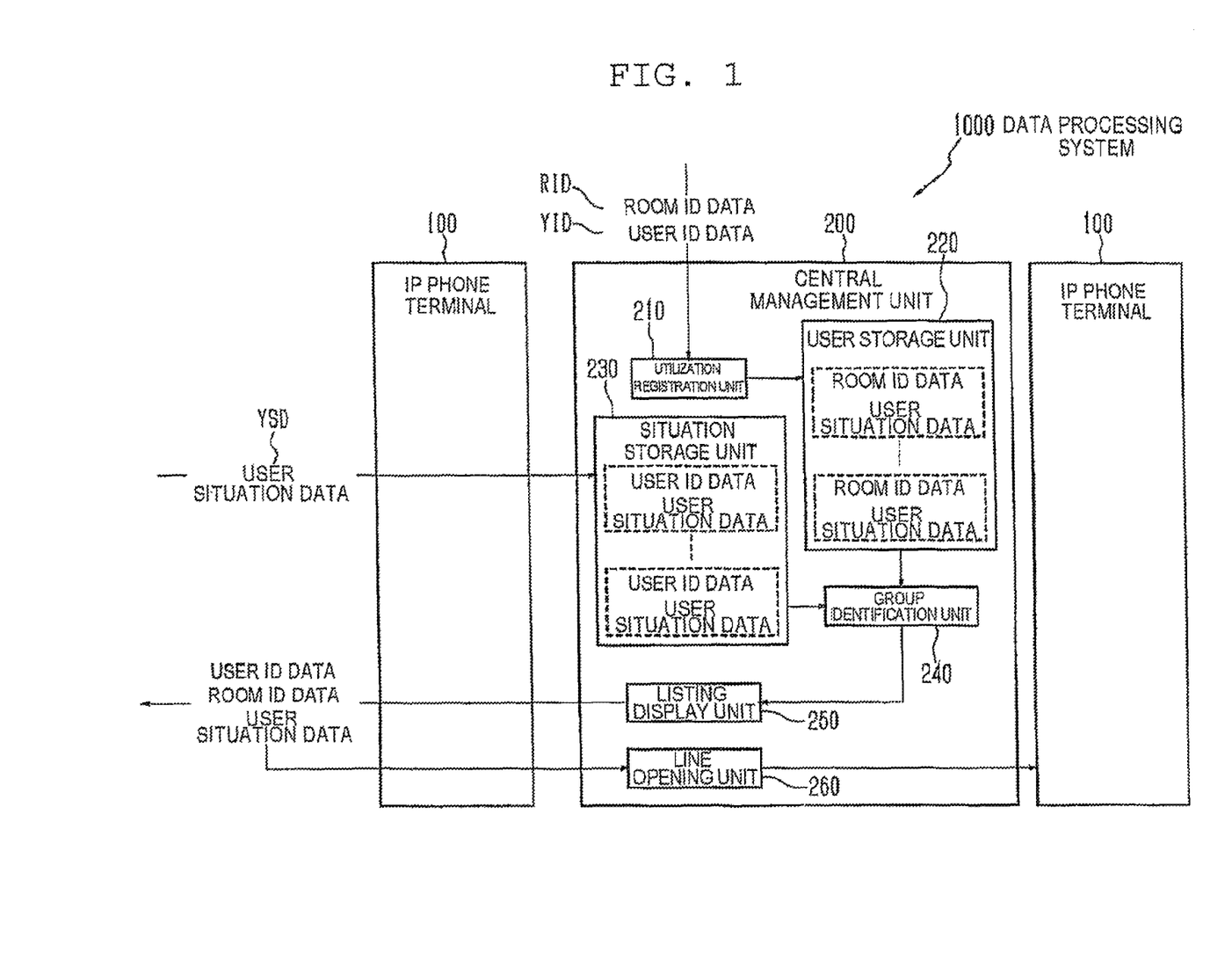
FIG. 1 is a block diagram showing a logical structure of a data processing system according to an embodiment of the present invention.

An embodiment of the present invention will be described hereunder, referring to the drawings. A data processing system 1000 according to this embodiment includes, as shown in FIG. 1, an IP phone terminal 100, exemplifying a plurality of data communication terminals having at least a data display function, individually provided in each hotel room HR, exemplifying a plurality of locations of use where general users CY individually check in; a utilization registration unit 210 that accepts an input of user ID data YID and room ID data RID, exemplifying location ID data of the hotel room HR, with respect to each general user CY who checks in; a user storage unit 220 that stores the inputted user ID data YID and the room ID data RID in association with each other; a situation storage unit 230 that stores user situation data YSD of the general user CY who has checked in with respect to each hotel room HR, together with the user ID data YID; a group identification unit 240 that identifies the plurality of general users CY who have checked in as a group; and a listing display unit 250 that causes each IP phone terminal 100 in the plurality of hotel rooms HR where the general users CY of the group have checked in, to display a listing of at least the user ID data YID, the room ID data RID and the user situation data YSD of another member of the group.

Figure 2:
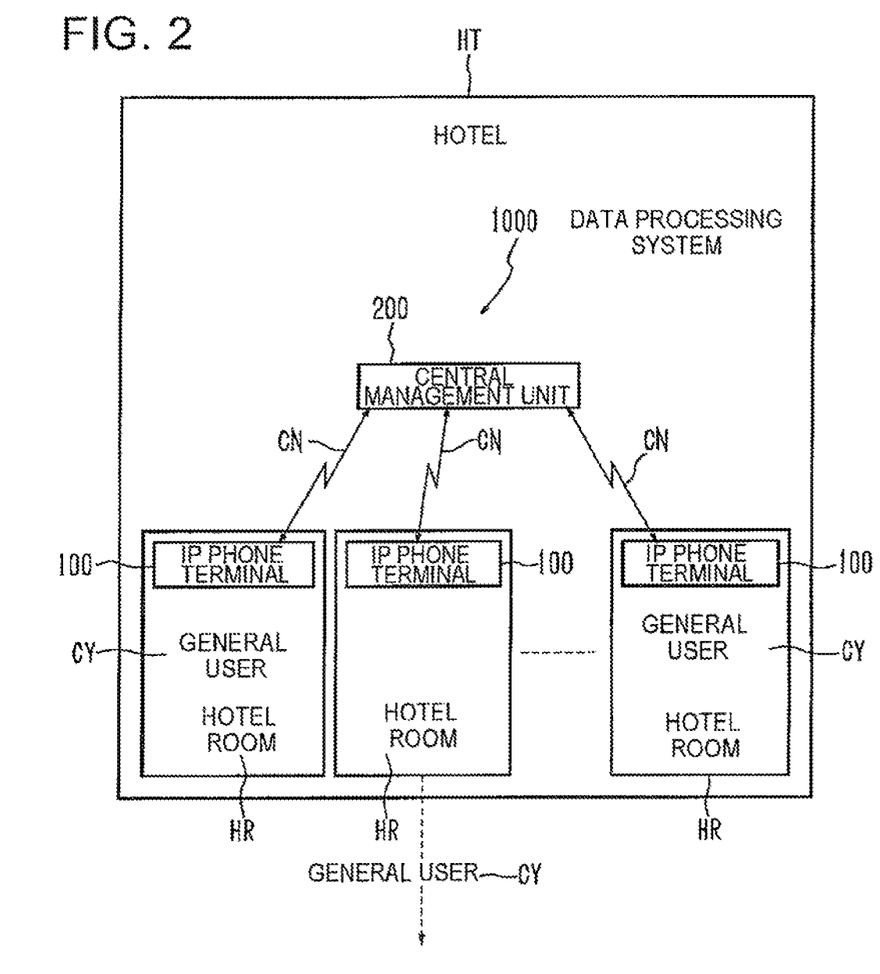
FIG. 2 is a block diagram showing a physical structure of the data processing system.

More particularly, as shown in FIG. 2, the data processing system 1000 according to this embodiment is utilized in a hotel HT. The hotel HT includes a plurality of hotel rooms HR as locations of use, where a general user CY individually checks in.

Naturally there may be cases where a plurality of general users CY check in for a hotel room HR, however for the sake of explicitness of the description, this embodiment exemplifies the case where a general user CY checks in for a hotel room HR.

In the data processing system 1000 according to this embodiment, an IP phone terminal 100 is individually provided in each of the plurality of hotel rooms HR, and a central management unit 200 is provided, for example, at the reception of the hotel HT. To the central management unit 200, the plurality of IP phone terminals 100 are connected through a network CN such as an in-house Local Area Network (LAN).

Figure 3:
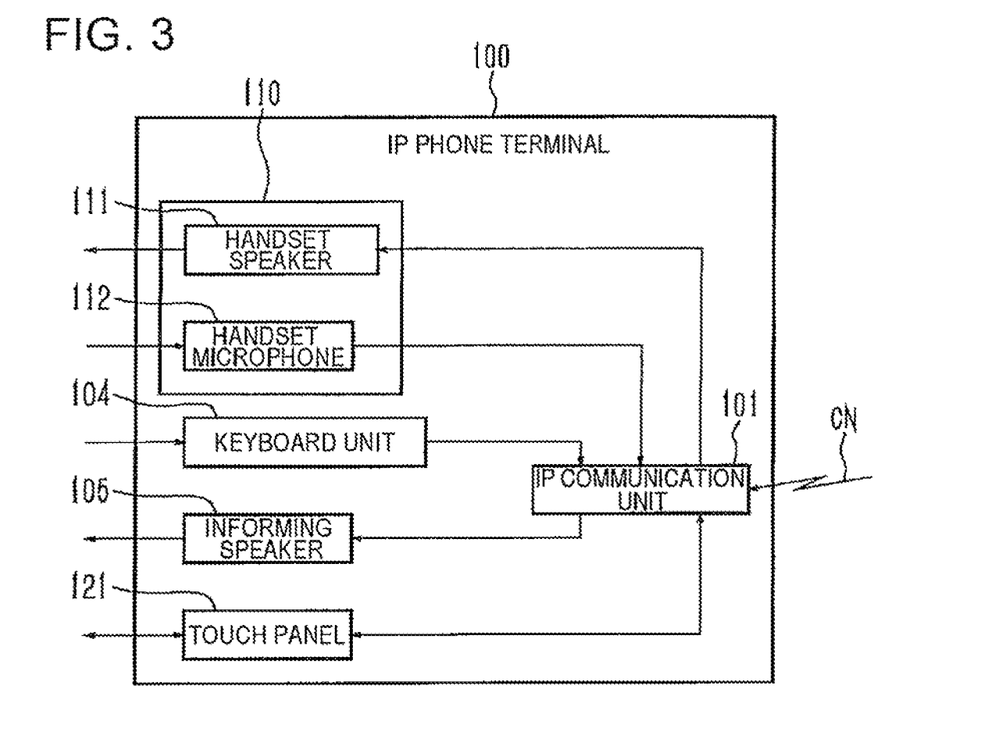
FIG. 3 is a block diagram showing a physical structure of an IP phone terminal.
Figure 4:
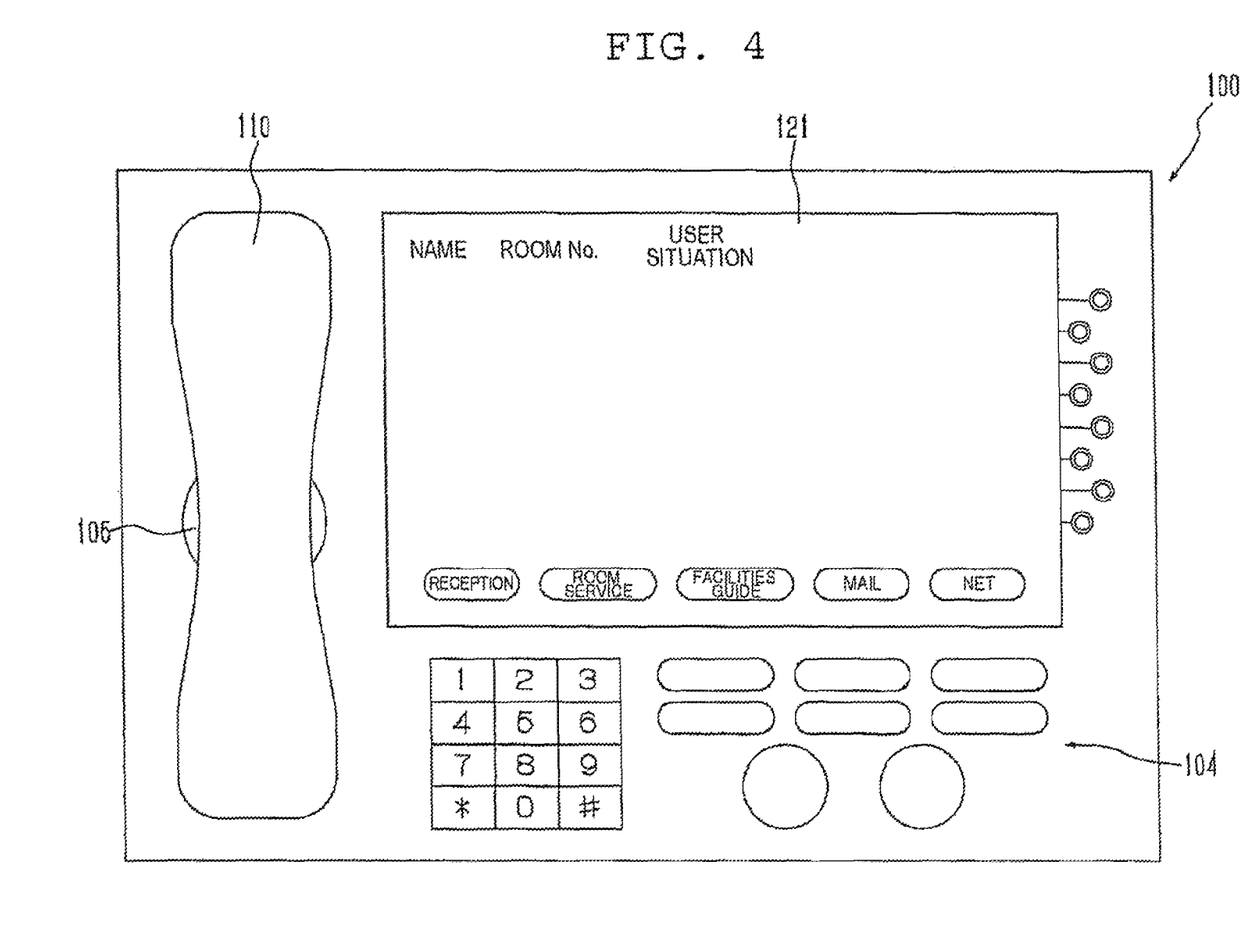
FIG. 4 is a plan view showing an appearance of the IP phone terminal.

The IP phone terminal 100 includes, as shown in FIGS. 3 and 4, hardware such as an IP communication unit 101, a handset speaker 111 and a handset microphone 112 of a handset 110, a keyboard unit 104, an informing speaker 105, and a large touch panel 121. The IP communication unit 101 contains a built-in microcomputer, to thereby integrally control the foregoing hardware according to a computer program implemented therein.

The central management unit 200 is constituted of what is known as a Session Initiation Protocol (SIP) server, and provides various functions to the IP phone terminal 100 according to an implemented computer program CP.

Figure 5:
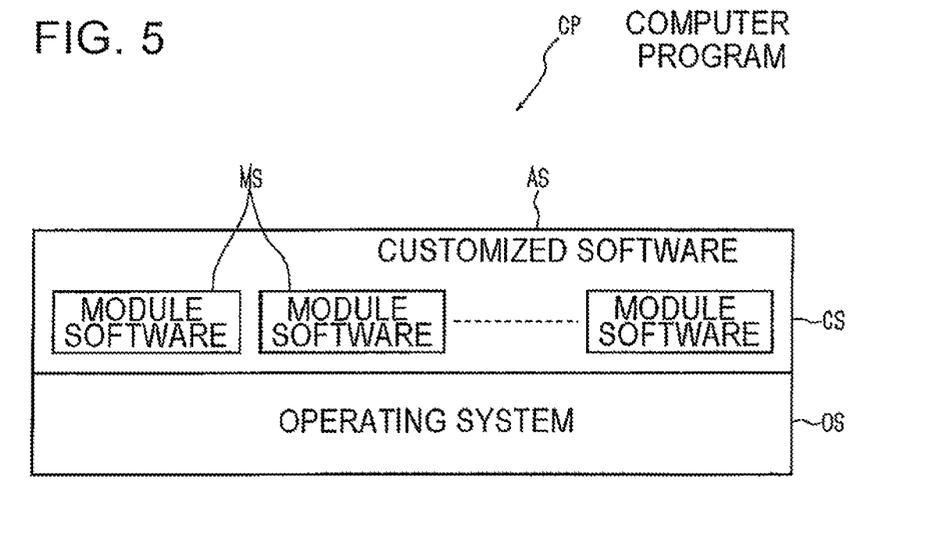
FIG. 5 is a block diagram showing a logical structure of a computer program of a central management unit.

The computer program CP is, as shown in FIG. 5, composed of a general-purpose operating system OS not customized for the hotel HT, and application software AS designed for the hotel HT.

The application software AS includes, for example, module software MS such as a plurality of types of widgets exclusively prepared in advance for the respective distinctive functions, and customized software CS that integrates such module software MS in compliance with requirements of the hotel HT.

The units 210 to 240 respectively correspond to the functions to be performed according to the computer program of the central management unit 200. The details will be respectively described later, among which, for example, the utilization registration unit 210 corresponds to the function of recognizing the data inputted through an input device such as a keyboard (not shown), according to the computer program implemented in the central management unit 200.

The user storage unit 220 and the situation storage unit 230 correspond to a memory area of a storage device such as a Hard Disc Drive (HDD) recognized by the central management unit 200 according to the computer program.

In this embodiment, the user storage unit 220 and the situation storage unit 230 are separately referred to as an example of the logical structure of the central management unit 200. However, these units may constitute a single memory area and, as will be subsequently described, the room ID data RID, the user ID data YID, and the user situation data YSD may be stored in a data file with respect to each general user CY.

The group identification unit 240 corresponds to the function of distinguishing the memory data in the storage device, performed by the central management unit 200 according to the computer program. The listing display unit 250 corresponds to the function of transmitting predetermined data to the IP phone terminal 100 of the hotel room HR, performed by the central management unit 200 according to the computer program.

The IP phone terminal 100 in the data processing system 1000 according to this embodiment displays a listing of the user ID data YID, room ID data RID, and the user situation data YSD, and also accepts inputting operation.

Accordingly, the central management unit 200 further includes, as shown in FIG. 1, a line opening unit 260 that calls a corresponding IP phone terminal 100 upon receipt of an input of at least either of the user ID data YID or the room ID data RID, and opens a VoIP line.

The IP phone terminal 100 also accepts an input of the user situation data YSD of the general user CY. In response to this, the situation storage unit 230 stores the inputted user situation data YSD.

The computer program for the central management unit 200 thus configured is written so as to cause the central management unit 200 to execute, for example, a utilization registration process of accepting an input of the user ID data YID and the room ID data RID of the hotel room HR, with respect to each general user CY; a user storage process of storing the inputted user ID data YID and the room ID data RID in association with each other; a situation storage process of storing user situation data YSD of the general user CY who has checked in with respect to each hotel room HR, together with the user ID data YID; a group identification process of identifying the plurality of general users CY who have checked in as a group; a listing display process of causing each of the IP phone terminals 100 in the plurality of hotel rooms HR where the general users CY of the group have checked in, to display a listing of at least the user ID data YID, the room ID data RID and the user situation data YSD of another member of the group; and a line opening process of calling the corresponding IP phone terminal 100 upon receipt of an input of at least either of the user ID data YID or the room ID data RID, to thereby open the VoIP line.

With the foregoing configuration, the data processing system 1000 according to this embodiment may be employed, for example, in the hotel HT. In this case, in the hotel HT the IP phone terminal 100 is provided in each of the plurality of hotel rooms HR, and the central management unit 200 at the hotel reception; for example.

Under such setting, when the general user CY checks in at the hotel HT, a staff of the hotel HT inputs, for example, user management data including the user ID data YID and the room ID data RID in the central management unit 200, with respect to each general user CY.

The user management data is constituted of, for example, the user ID data YID including a user number, user name, and user address, the room ID data RID including the room number, group ID data including a serial number of each group to be described later, and the user situation data YSD representing a situation selected out of a plurality of situations prepared in advance.

Figure 6:
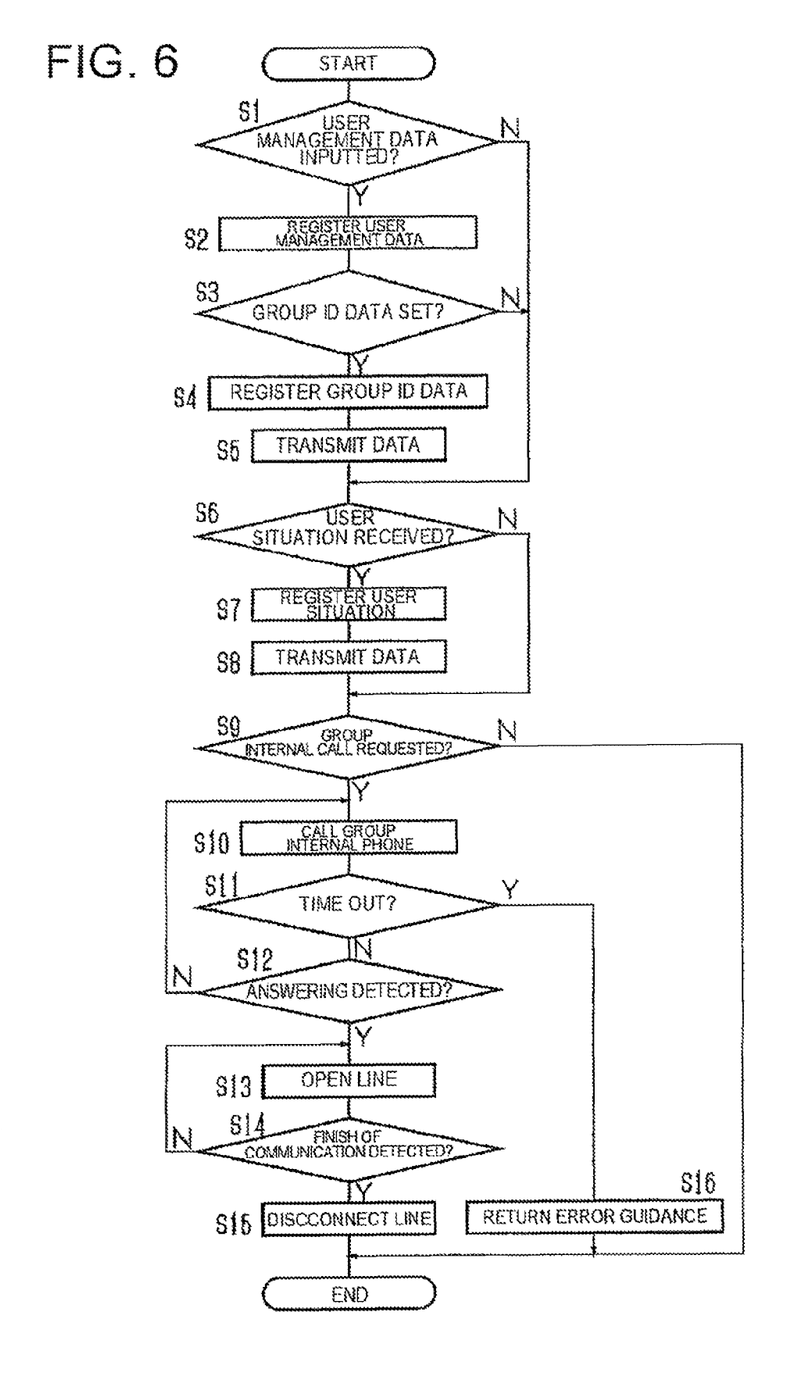
FIG. 6 is a flowchart showing a data processing method executed by the central management unit.

Referring to FIG. 6, the central management unit 200 stores, upon detecting an input of the user management data (step S1-Y), the inputted user ID data YID and room ID data RID in association with each other (step S2).

In the case where a plurality of general users CY have checked in as a group, the group ID data of that group is also inputted (step S3-Y), and hence the group ID data is also set as the user management data (step S4).

Once the user management data of the group is registered as above, the central management unit 200 transmits the user management data of the group to the IP phone terminal 100 of the hotel room HR of the general users CY of the group (step S5).

Figure 7:
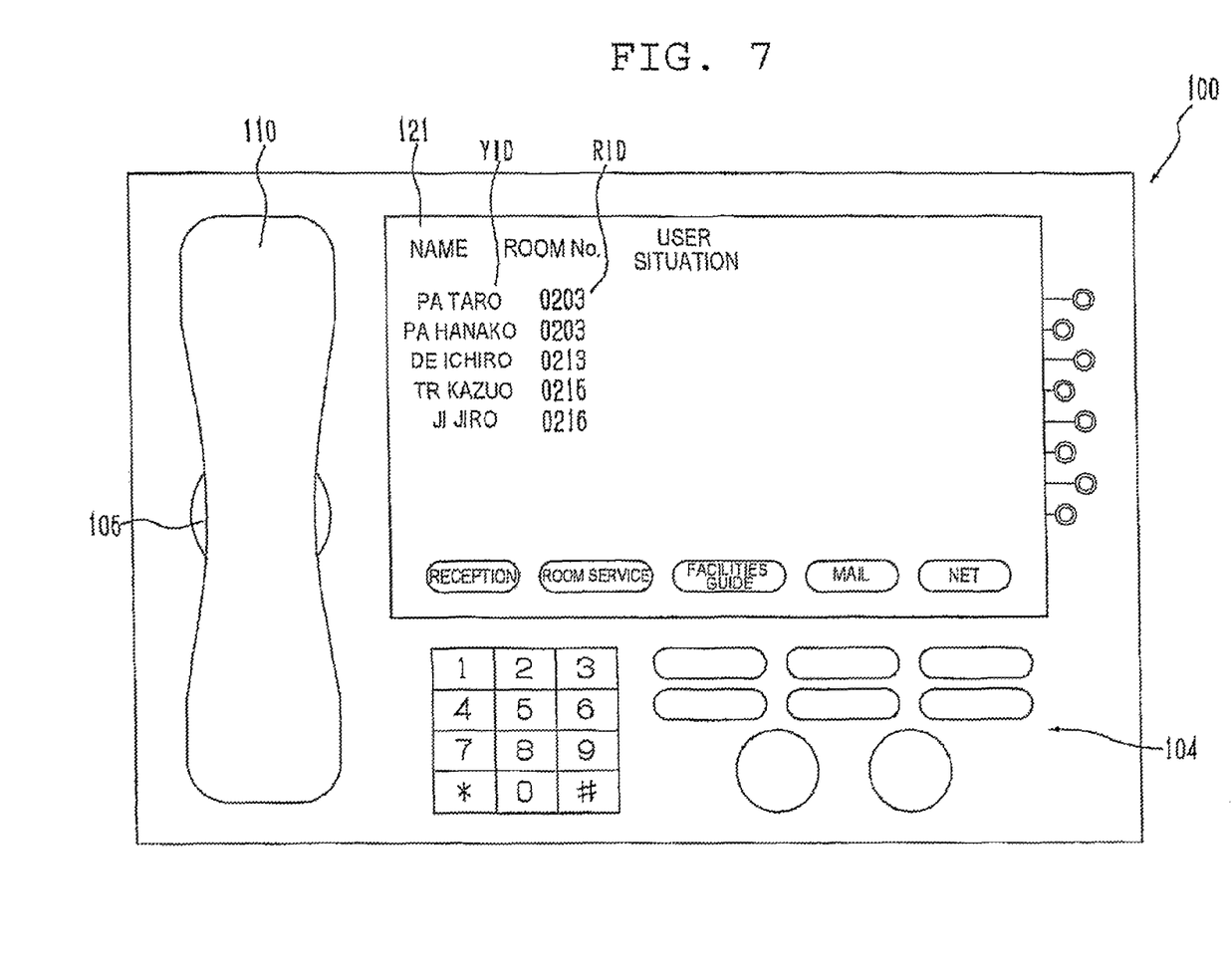
FIG. 7 is a schematic plan view showing the IP phone terminal displaying a user name which is user ID data, and a room number which is room ID data, on a touch panel.

In this case, the central management unit 200 transmits the user name, corresponding to the user ID data YID in the user management data, and the room number corresponding to the room ID data RID, so that the listing of the user names of the group and the room numbers is displayed on the touch panel 121 of the IP phone terminal 100, as shown in FIG. 7.

By the side of the IP phone terminal 100, a so-called user manual (not shown) is provided, which describes an inputting method of the user situation and so on.

Accordingly, the general user can manually operate the IP phone terminal 100 if the user so desires, upon checking the inputting method, to thereby input the user situation data YSD. To input the user situation data YSD, a pull-down menu (not shown) is displayed for selection of, for example, "in the room" or "outside".

Upon detecting such input (step S6), the central management unit 200 registers the user situation inputted as above in the user management data (step S7), and transmits the user management data to the IP phone terminals 100 of the group (step S8).

Figure 8:
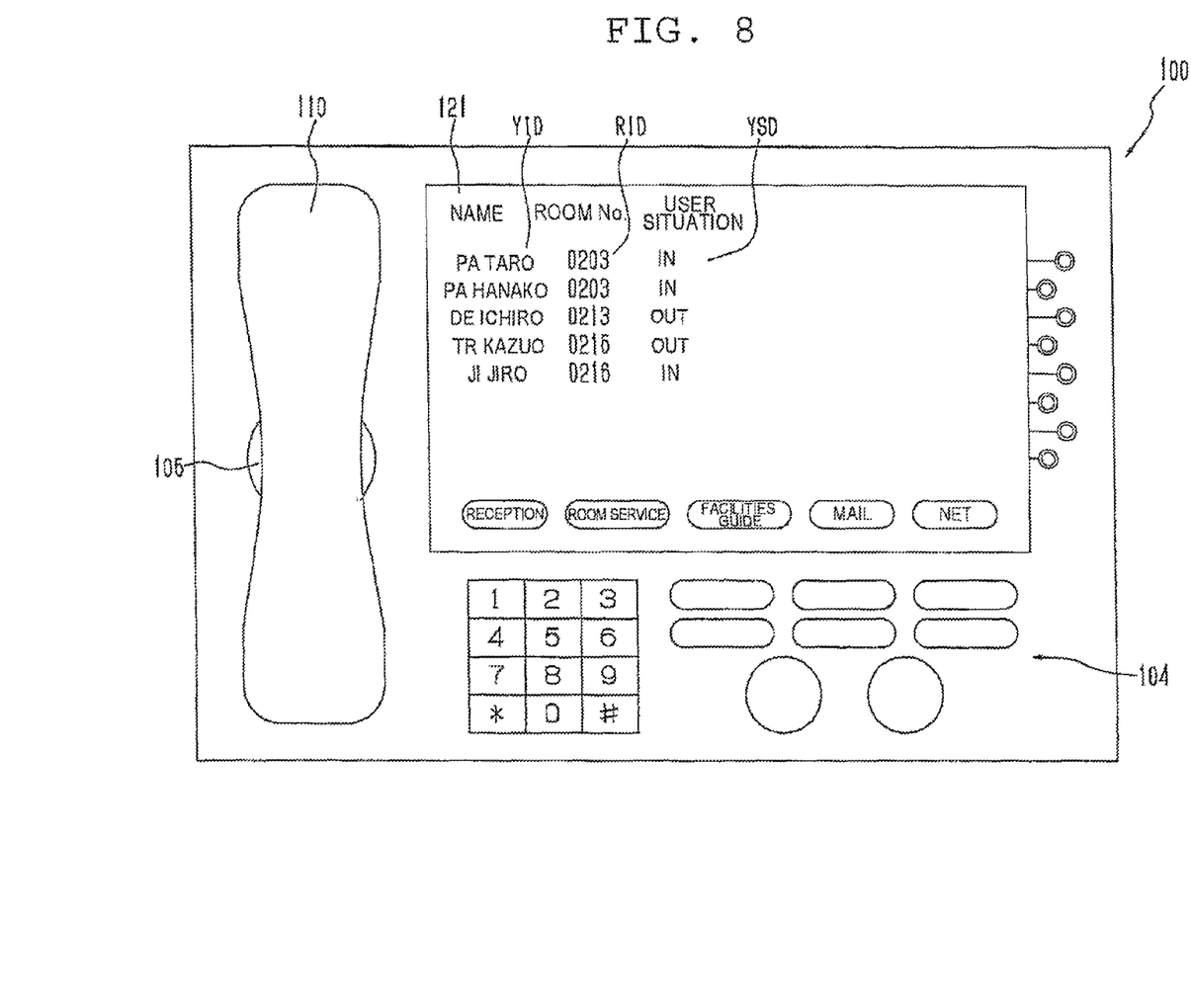
FIG. 8 is a schematic plan view showing the IP phone terminal displaying also user situation data on the touch panel.

On the touch panel 121 of those IP phone terminals 100, the inputted user situation is displayed in common, with respect to each user name. Accordingly, as shown in FIG. 8, the general user CY in the hotel room HR can confirm at a glance of the IP phone terminal 100 whether the members of the group are in the room or outside the room.

In the case where the general user CY wishes to talk with another member of the group under such situation, the general user CY manually selects at least either of the user name representing the user ID data YID or the room number representing the room ID data RID displayed on the touch panel 121 of the IP phone terminal 100.

Upon detecting the manual operation on the IP phone terminal 100 (step S9-Y), the central management unit 200 calls another IP phone terminal 100 designated by the inputting operation (step S10).

When another general user CY in the designated hotel room HR answers on the IP phone terminal 100 called as above, the central management unit 200 detects the answering (step S12-Y) and opens the VoIP communication line (step S13).

Thus, the general users CY who have checked in as the group make phone calls through the IP phone terminal 100 while staying in the respective hotel rooms HR. Then once the general users CY finish the communication through the IP phone terminal 100, the central management unit 200 detects the finish of the call (step S14-Y) and disconnects the VoIP communication line (step S15).

Here, in the case where the IP phone terminal 100 being called as above is not answered within a predetermined time (step S11-N), the central management unit 200 transmits an error guidance to the IP phone terminal 100 that is the calling source (step S16).

In this case, the error guidance to such effect that "Mr./Ms so and so cannot answer the phone. Please call again after a while or visit the room number xx." or the like is displayed on the touch panel 121 of the IP phone terminal 100 (not shown).

The IP phone terminal 100 according to this embodiment also displays operation icons such as "reception", "room service", "facilities guide", "mail", and "net" in a lower portion of the touch panel 121, as shown in FIG. 4 and so on.

When the general user CY operates the desired operation icon, the central management unit 200 detects such operation and provides the designated function to the IP phone terminal 100 (not shown).

In the data processing system 1000 according to this embodiment, once the user ID data YID and the room ID data RID of the hotel room HR are inputted to the central management unit 200 as above with respect to each general user CY who has checked in, the central management unit 200 stores the user ID data YID and the room ID data RID in association with each other, and stores the user situation data YSD of the general user CY who has checked in with respect to each hotel room HR, together with the user ID data YID.

Here, the central management unit 200 identifies the plurality of general users CY who has checked in as the group, and causes each IP phone terminal 100 in the plurality of hotel rooms HR, where the general users CY of the group have checked in, to display the listing of the user ID data YID, the room ID data RID, and the user situation data YSD of the group members.

Therefore, the general users CY of the group, who have individually checked in for the plurality of hotel rooms HR, can confirm the situation of another member at a glance. In particular, since whether the user is in or outside the room is displayed as the user situation data YSD, the general users CY of the group who have individually checked in for the plurality of hotel rooms HR can easily confirm an accompanying schedule with another member.

Also, at the moment that the general users CY of the group have checked in at the hotel HT, the user ID data YID and the room ID data RID are displayed on the IP phone terminal 100 in the corresponding hotel rooms HR.

Accordingly, without the need for the general user CY to execute a specific manual operation, the allocation of the hotel room HR to each member can be confirmed at a glance, and the user situation data YSD can be easily inputted.

Besides, the user situation data YSD is to be voluntarily inputted by each general user CY. Therefore, such user situation data YSD that the general user CY does not wish to disclose is not automatically inputted and displayed.

Further, when the user ID data YID and the room ID data RID displayed on the IP phone terminal 100 are inputted as above, the designated IP phone terminal 100 is called and the communication line is opened.

Accordingly, communication with another member of the group can be easily made, without the need to execute troublesome manual operation such as inputting the room number. Also, the communication through the VoIP line can be made among three or more IP phone terminals 100, and therefore three or more general users CY of the group can simultaneously communicate like a phone conference.

Meanwhile, generally it is possible to make free calls from an IP phone terminal 100 to another of the same terms, through the internet. Accordingly, it is possible to provide a free call service from the IP phone terminal 100 of this embodiment, to an external IP phone terminal (not shown) outside the hotel HT.

Further, the computer program CP of the central management unit 200 is, as stated above, composed of the general-purpose operating system OS and the application software AS designed for the hotel HT, which includes the module software MS such as a plurality of types of widgets exclusively prepared in advance for the respective distinctive functions, and the customized software CS that integrates such module software MS in compliance with requirements of the hotel HT.

Therefore, the computer program CP for the central management unit 200 appropriate for various types of hotels HT can be easily built, to thereby easily satisfy various requirements of the hotel HT.

It is to be understood that the present invention is not limited to this embodiment, but various modifications may be made within the scope of the present invention. For example, the embodiment exemplifies the case where the general user CY can input the user situation data YSD if the user so desires.

However, the data processing system may further include a situation detector (not shown) that detects the user situation data YSD of the general user CY with respect to each hotel room HR, and the central management unit 200 may store the detected user situation data YSD and cause the IP phone terminal 100 to display such data.

For example, there are hotels that adopt an electronic card as the room key of the hotel room, so that the room facilities can only be utilized by inserting the electronic card in a card slot located close to the entrance (not shown).

In such case the central management unit can detect whether the electronic card is inserted, to thereby detect whether the general user is in or outside the room, as the user situation data YSD.

The embodiment exemplifies the case where the user situation data YSD includes the plurality of items prepared in advance. However, the user situation data YSD may be constituted of text data to be inputted by the general user CY.

Also, the user situation data YSD may be constituted of a combination of the menu prepared in advance and the text data, or a combination of a plurality of menus. In this case, for example "STROLL" can be added by text data or from pull-down menu as shown in FIG. 9, after selecting "out" from the pull-down menu.

The embodiment exemplifies the case where various data of the general user CY who has checked in is registered in the central management unit 200 and displayed on the IP phone terminal 100. However, in the case where the general user CY has reserved the check-in, the central management unit 200 may cause the IP phone terminal 100 to display the data related to the reservation at an appropriate timing.

Figure 9:
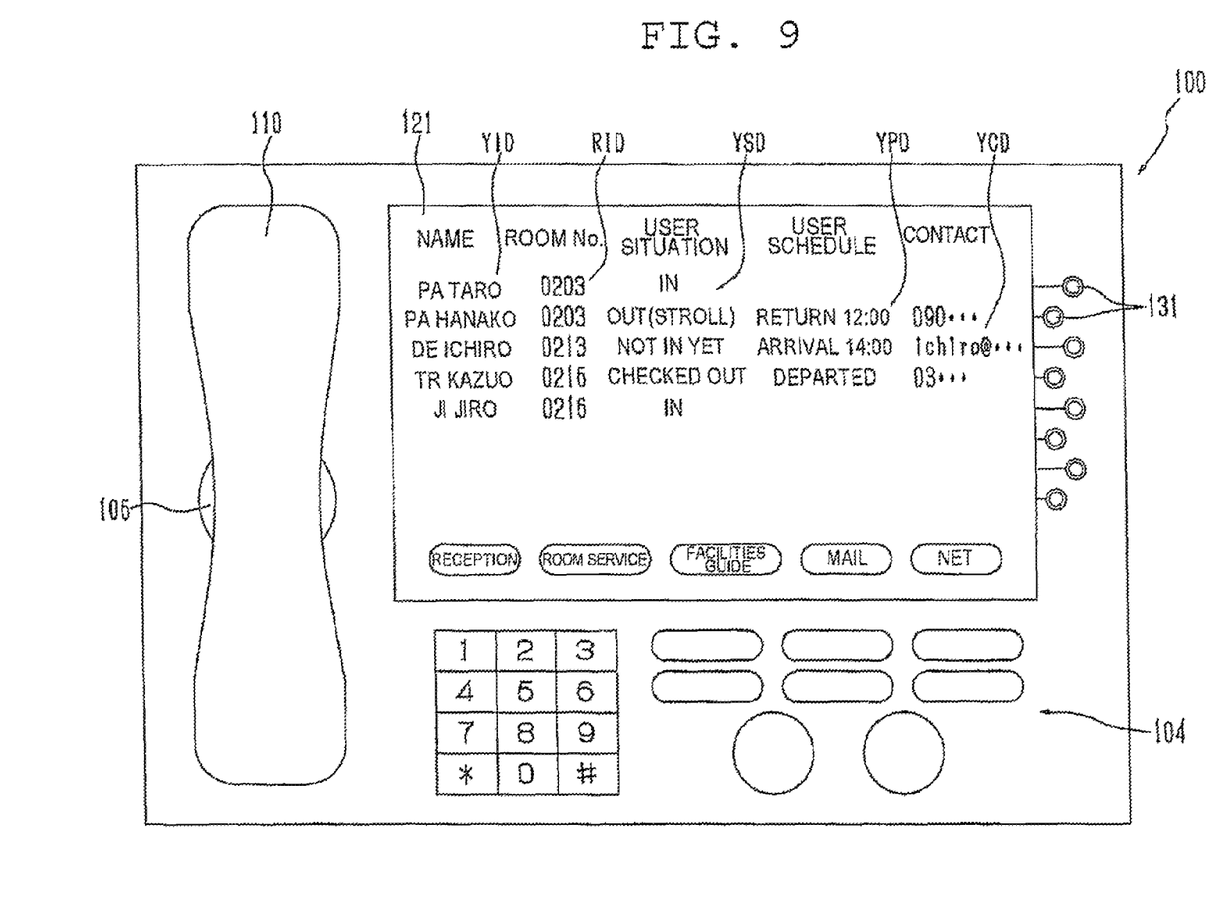
FIG. 9 is a schematic plan view showing a modified example of the IP phone terminal, displaying various data on the touch panel.

In this case, for example "NOT IN YET" may be displayed as the user situation data YSD of the general user CY scheduled to check in, as shown in FIG. 9. Likewise, in the case where a part of the general users CY of the group has departed earlier, for example "CHECKED OUT" may be displayed.

Also, the embodiment exemplifies the case where only the user ID data YID, the room ID data RID, and the user situation data YSD are registered in the central management unit 200 and displayed on the IP phone terminal 100.

However, as shown in FIG. 9, user schedule data YPD and user contact data YCD may further be registered in the central management unit 200 and displayed on the IP phone terminal 100. Such user schedule data YPD may also be inputted, for example, by the general user CY in the text data or from the pull-down menu on the IP phone terminal 100.

Also, the general user CY with the confirmed check-in schedule as described above may notify the staff of the hotel HT of the user schedule data YPD, so that the staff may input the data in the central management unit 200 and display the data on the IP phone terminal 100.

In this case, for example "ARRIVAL 14:00" may be registered in the central management unit 200 and displayed on the IP phone terminal 100, as the user schedule data YPD of the general user CY whose user situation data YSD is "NOT IN YET".

Also, a homepage of the hotel HT may be opened on the internet, so that the central management unit 200 may accept reservations of check-in through the internet. In this case, the general user CY who is registered as the member can remotely input from a personal computer at home the user ID data YID, the user situation data YSD, and the user schedule data YPD in the central management unit 200 of the hotel HT, and display those data on the IP phone terminal 100.

With the user schedule data YPD, a scheduled time may be inputted. In this case, the central management unit 200 stores the scheduled time together with the inputted user schedule data YPD, to thereby cause the IP phone terminal 100 to display the user schedule data when the actual time reaches the scheduled time.

Further, like the user schedule data YPD, the user contact data YCD may also be inputted by the general user CY through the IP phone terminal 100, or from the personal computer at home to the central management unit 200 of the hotel HT.

The user contact data YCD thus registered may include, for example, the number of a mobile phone terminal, mail address of the mobile phone terminal and the personal computer, and the number of a fixed phone of the general user CY.

For example, when the mobile phone number or the fixed phone number displayed on the IP phone terminal 100 is inputted, the central management unit 200 may call the mobile phone terminal or the fixed phone with the inputted number, for connection with the IP phone terminal 100.

Also, when the mail address displayed on the IP phone terminal 100 is inputted, the e-mail addressed to that mail address can be edited on and transmitted from the IP phone terminal 100, and the central management unit 200 can transmit the e-mail to the internet. Such arrangement allows the general user CY staying in the hotel room HR to easily communicate with another general user CY located outside the hotel HT.

The embodiment exemplifies the case where the user management data of all the general users CY of the group is displayed in common on all the IP phone terminals 100. However, the IP phone terminal 100 of the respective members may be set to display only the user management data of other members (not shown).

Also, the embodiment exemplifies the case where, once the user management data displayed on the IP phone terminal 100 is inputted, the VoIP line to the designated IP phone terminal 100 is opened for communication.

However, a mailer program may be activated for transmission of an e-mail, or for executing what is known as chatting, once the user management data displayed on the IP phone terminal 100 is inputted (not shown).

Also, the embodiment exemplifies the case where the user management data is uniformly displayed on the touch panel 121 of the IP phone terminal 100. However, a listing of the user ID data YID and the room ID data RID may be displayed on the IP phone terminal 100 in a format corresponding to the user situation data YSD.

For example, the display of the user management data of the member in the room may be highlighted and that of the member outside the room may be darkened, to thereby make it still easier for the general user CY to confirm at a glance whether the member is in or outside the room.

Also, the embodiment exemplifies the case where the IP phone terminal 100 of the general user CY who is detected to be outside the room can also be called. However, the system may be arranged such that only the IP phone terminal 100 of the general user CY who is detected to be in the room can be called.

Further, the embodiment exemplifies the case where the IP phone terminal 100 displays various data on the touch panel 121, so as to accept an inputting operation. However, an operation device such as mechanical switches 131 may be provided close to a displayer such as the touch panel 121 as shown in FIG. 9, for inputting the displayed data.

Further, the embodiment exemplifies the case where the user manual of the IP phone terminal 100 is provided in the hotel room HR in a form of a booklet. However, the user manual may be registered in the IP phone terminal 100 or the central management unit 200, as electronic data that can be viewed on the IP phone terminal 100.

Further, the embodiment exemplifies the case where the central management unit 200 of the data processing system 1000 provides various functions to the IP phone terminal 100. However, a part or the whole of the functions of the units 210 and others of the central management unit 200 may be directly implemented in the IP phone terminal 100 (not shown).

Further, this embodiment exemplifies the case where the units of the data processing system 1000 can be logically realized as the functions by the computer program. However, each of such units may be formed as exclusive hardware, or realized as a combination of software and hardware.

Still further, the embodiment exemplifies the case where the general user CY checks in one by one for the hotel room HR, for the sake of explicitness of the description as stated above. Naturally, however, a plurality of general users CY may check in for the hotel room HR, at actually existing hotels HT.

In such case, for example a plurality of user ID data YID may be displayed with respect to the identical room ID data RID, or only the representative user ID data YID of the room ID data RID may be displayed.

Still further, according to the embodiment the location of use is exemplified by the hotel room HR of the hotel HT.

However, the location of use may be, for example, a reserved seat of a public transport such as a long-distance train or a passenger plane (not shown).

It is a matter of course that the foregoing embodiment and the plurality of modifications may be combined unless technical contradiction is incurred. Also, although the structure of the constituents according to the embodiment and modifications has been specifically described, such structure may be modified in various manners within the scope of the present invention.

The invention claimed is:

1. A data processing system, comprising:
   a plurality of data communication terminals that have at least a data display function, that are individually provided in each of a plurality of locations of use where general users individually check in;
   a utilization registration unit that accepts an input of user ID data and location ID data of said location of use, with respect to each general user who checks in;
   a user storage unit that stores said user ID data and said location ID data that have been inputted, in association with each other;
   a situation storage unit that stores user situation data of said general user who has checked in with respect to each location of use, together with said user ID data;
   a group identification unit that identifies said plurality of general users who have checked in as a group; and
   a listing display unit that causes each of said data communication terminals in said plurality of locations of use where said general users of said group have checked in, to display a listing of at least said user ID data, said location ID data, and said user situation data of another member of said group;
   wherein each of said data communication terminals is constituted of an Internet Protocol (IP) phone terminal that displays a listing of said user ID data, said location ID data, and said user situation data and also accepts an inputting operation;
   said data processing system further comprising a line opening unit that, upon receipt of an input of at least either of said user ID data or said location ID data, calls a corresponding one of said data communication terminals, and opens a Voice Over IP (VoIP) line.

2. The data processing system according to claim 1, wherein each of said data communication terminals also accepts an input of a number of a mobile phone terminal of said general user;
   said situation storage unit stores said mobile phone number together with said user ID data;
   said listing display unit causes each of said data communication terminals to display said mobile phone number together with said user ID data; and
   once said mobile phone number is inputted, said line opening unit calls said mobile phone terminal corresponding thereto.

3. The data processing system according to claim 1, wherein said listing display unit causes each of said data communication terminals to display a listing of said user ID data and said location ID data in a format corresponding to said user situation data.

4. The data processing system according to claim 1, further comprising a situation detection unit that detects said user situation data with respect to each of said locations of use;
   wherein said situation storage unit stores said user situation data detected.

5. The data processing system according to claim 1, wherein each of said data communication terminals accepts an input of said user situation data by said general user; and
   said situation storage unit stores said user situation data inputted.

6. The data processing system according to claim 1, wherein each of said data communication terminals accepts an input of user schedule data by said general user;
   said situation storage unit also stores said user schedule data inputted, together with said user ID data; and
   said listing display unit causes each of said data communication terminals to also display said user schedule data together with said user ID data.

7. The data processing system according to claim 6, wherein each of said data communication terminals accepts an input of a scheduled time together with said user schedule data;
   said situation storage unit also stores said scheduled time together with said user schedule data inputted; and
   said listing display unit causes each of said data communication terminals to display said user schedule data when an actual time reaches said scheduled time.

8. The data processing system according to claim 1, comprising:
   said plurality of data communication terminals; and
   a central management unit including at least said utilization registration unit, said user storage unit, said situation storage unit, said group identification unit, and said listing display unit, to thereby execute data communication with said plurality of data communication terminals.

9. A central management unit connected to a plurality of data communication terminals that have at least a data display function, that are individually provided in each of a plurality of locations of use where general users individually check in, comprising:
   a utilization registration unit that accepts an input of user ID data and location ID data of said location of use, with respect to each general user who checks in;
   a user storage unit that stores said user ID data and said location ID data that have been inputted, in association with each other;
   a situation storage unit that stores user situation data of said general user who has checked in with respect to each location of use, together with said user ID data;
   a group identification unit that identifies said plurality of general users who have checked in as a group; and
   a listing display unit that causes each of said data communication terminals in said plurality of locations of use where said general users of said group have checked in, to display a listing of at least said user ID data, said location ID data, and said user situation data of another member of said group;
   wherein each of said data communication terminals is constituted of an Internet Protocol (IP) phone terminal that displays a listing of said user ID data, said location ID data, and said user situation data and also accepts an inputting operation;
   said data processing system further comprising a line opening unit that, upon receipt of an input of at least either of said user ID data or said location ID data, calls a corresponding one of said data communication terminals, and opens a Voice Over IP (VoIP) line.

10. A data processing method to be executed by a computer connected to a plurality of data communication terminals that have at least a data display function, that are individually provided in each of a plurality of locations of use where general users individually check in, comprising:
- registering utilization by accepting an input of user ID data and location ID data of said location of use, with respect to each general user who checks in;
- storing said user ID data and said location ID data that have been inputted, in association with each other;
- storing user situation data of said general user who has checked in with respect to each location of use, together with said user ID data;
- identifying said plurality of general users who have checked in as a group; and
- causing each of said data communication terminals in said plurality of locations of use where said general users of said group have checked in, to display a listing of at least said user ID data, said location ID data, and said user situation data of another member of said group;
- wherein each of said data communication terminals is constituted of an Internet Protocol (IP) phone terminal that displays a listing of said user ID data, said location ID data, and said user situation data and also accepts an inputting operation;
- said data processing system further comprising a line opening unit that, upon receipt of an input of at least either of said user ID data or said location ID data, calls a corresponding one of said data communication terminals, and opens a Voice Over IP (VoIP) line.

* * * * *